(12) United States Patent
Minoo et al.

(10) Patent No.: US 9,264,725 B2
(45) Date of Patent: Feb. 16, 2016

(54) SELECTION OF PHASE OFFSETS FOR INTERPOLATION FILTERS FOR MOTION COMPENSATION

(75) Inventors: Koohyar Minoo, San Diego, CA (US); David Baylon, San Diego, CA (US); Jian Lou, San Diego, CA (US); Ajay Luthra, San Diego, CA (US); Krit Panusopone, San Diego, CA (US); Limin Wang, San Diego, CA (US)

(73) Assignee: GOOGLE INC., Mountain View, CA (US)

( * ) Notice: Subject to any disclaimer, the term of this patent is extended or adjusted under 35 U.S.C. 154(b) by 872 days.

(21) Appl. No.: 13/532,217

(22) Filed: Jun. 25, 2012

(65) Prior Publication Data

US 2013/0051463 A1 Feb. 28, 2013

Related U.S. Application Data

(60) Provisional application No. 61/501,150, filed on Jun. 24, 2011, provisional application No. 61/502,316,
(Continued)

(51) Int. Cl.
*H04N 19/132* (2014.01)
*H04N 19/139* (2014.01)
(Continued)

(52) U.S. Cl.
CPC ........... *H04N 19/132* (2014.11); *H04N 19/139* (2014.11); *H04N 19/159* (2014.11);
(Continued)

(58) Field of Classification Search
CPC .................................................... H04N 19/132
USPC .......................................... 375/240.02–240.2
See application file for complete search history.

(56) References Cited

U.S. PATENT DOCUMENTS

| 5,511,137 A | 4/1996 | Okada |
| 6,252,576 B1 | 6/2001 | Nottingham |

(Continued)

FOREIGN PATENT DOCUMENTS

| EP | 1359763 | 11/2003 |
| EP | 1507415 | 2/2005 |

(Continued)

OTHER PUBLICATIONS

Alshina E. et al.:"CE3: Experimental results of DCTIF by Samsung", 4,JCT-VC Meeting; 95, MPEG Meeting; Daegu; (Joint Collaborative Team on Video Coding of ISO/IEC JTC1/SC29IWG1 and ITU-T SG.16),No. JCTVC-D344, Jan. 15, 2011, Sections 1,2 and 6.

(Continued)

*Primary Examiner* — Dave Czekaj
*Assistant Examiner* — Shanika Brumfield
(74) *Attorney, Agent, or Firm* — Young Basile Hanlon & MacFarlane P.C.

(57) ABSTRACT

In one embodiment, a method for encoding or decoding video content is provided. The method determines a plurality of sets of interpolation filters for use in interpolating sub-pel pixel values for a temporal prediction process of video content. Different sets of interpolation filters include different phase offset characteristics. A unit of video content is received. The method then selects one of the set of interpolation filters to interpolate a set of sub-pel pixel values for use in the temporal prediction process for the unit of video content based on characteristics associated with the encoding or decoding of the video content. The one of the set of interpolation filters is selected based on the phase offset characteristic of the one of the set of interpolation filters and the characteristics associated with the encoding or decoding.

31 Claims, 8 Drawing Sheets

Related U.S. Application Data filed on Jun. 28, 2011, provisional application No. 61/504,159, filed on Jul. 1, 2011, provisional application No. 61/506,611, filed on Jul. 11, 2011, provisional application No. 61/535,939, filed on Sep. 16, 2011, provisional application No. 61/536,494, filed on Sep. 19, 2011, provisional application No. 61/557,420, filed on Nov. 9, 2011.

(51) Int. Cl.

| | | |
|---|---|---|
| *H04N 19/159* | (2014.01) | |
| *H04N 19/176* | (2014.01) | |
| *H04N 19/46* | (2014.01) | |
| *H04N 19/51* | (2014.01) | |
| *H04N 19/182* | (2014.01) | |
| *H04N 19/82* | (2014.01) | |
| *H04N 19/523* | (2014.01) | |

(52) U.S. Cl.
CPC ............ *H04N19/176* (2014.11); *H04N 19/182* (2014.11); *H04N 19/46* (2014.11); *H04N 19/51* (2014.11); *H04N 19/523* (2014.11); *H04N 19/82* (2014.11)

(56) References Cited

U.S. PATENT DOCUMENTS

| | | | | |
|---|---|---|---|---|
| 6,724,847 | B1 * | 4/2004 | Kallman | H04L 7/0029 329/345 |
| 7,155,213 | B1 | 12/2006 | Almeda et al. | |
| 7,349,473 | B2 | 3/2008 | Hallapuro et al. | |
| 7,505,636 | B2 * | 3/2009 | MacInnis | H04N 19/80 382/300 |
| 7,555,043 | B2 | 6/2009 | Sato et al. | |
| 7,660,471 | B2 | 2/2010 | Bjontegaard | |
| 7,778,494 | B2 | 8/2010 | Shastry et al. | |
| 7,958,177 | B2 | 6/2011 | Zhu | |
| 7,965,177 | B2 | 6/2011 | Kobayashi et al. | |
| 8,208,564 | B2 | 6/2012 | Bossen et al. | |
| 8,437,581 | B2 * | 5/2013 | Lou | H04N 19/61 348/538 |
| 8,451,889 | B2 * | 5/2013 | Lee | H04N 19/46 375/240 |
| 8,565,558 | B2 | 10/2013 | Lou et al. | |
| 8,576,906 | B2 | 11/2013 | Andersson et al. | |
| 8,792,559 | B2 | 7/2014 | Robertson et al. | |
| 8,811,484 | B2 | 8/2014 | Motta et al. | |
| 2003/0112864 | A1 * | 6/2003 | Karczewicz | G06T 3/4007 375/240.01 |
| 2003/0156646 | A1 * | 8/2003 | Hsu | H04N 19/136 375/240.16 |
| 2003/0194007 | A1 | 10/2003 | Chen et al. | |
| 2003/0194009 | A1 | 10/2003 | Srinivasan | |
| 2004/0062307 | A1 | 4/2004 | Hallapuro et al. | |
| 2004/0076333 | A1 | 4/2004 | Zhang et al. | |
| 2004/0213470 | A1 | 10/2004 | Sato et al. | |
| 2005/0105611 | A1 | 5/2005 | Bjontegaard | |
| 2005/0105617 | A1 | 5/2005 | Chono | |
| 2006/0133506 | A1 | 6/2006 | Dang | |
| 2006/0268991 | A1 | 11/2006 | Segall et al. | |
| 2006/0294171 | A1 * | 12/2006 | Bossen | H04N 19/139 708/300 |
| 2007/0133687 | A1 | 6/2007 | Wittmann et al. | |
| 2008/0075165 | A1 | 3/2008 | Ugur et al. | |
| 2008/0089418 | A1 | 4/2008 | Kim et al. | |
| 2008/0166068 | A1 | 7/2008 | Fuchigami | |
| 2008/0205793 | A1 | 8/2008 | Nilsson et al. | |
| 2009/0016634 | A1 | 1/2009 | Cox et al. | |
| 2009/0257499 | A1 | 10/2009 | Karczewicz et al. | |
| 2009/0257503 | A1 | 10/2009 | Ye et al. | |
| 2010/0002770 | A1 | 1/2010 | Motta et al. | |
| 2010/0111182 | A1 | 5/2010 | Karczewicz et al. | |
| 2010/0135398 | A1 | 6/2010 | Wittmann et al. | |
| 2010/0246998 | A1 | 9/2010 | He et al. | |
| 2011/0116546 | A1 | 5/2011 | Guo et al. | |
| 2011/0200108 | A1 | 8/2011 | Joshi et al. | |
| 2011/0243471 | A1 | 10/2011 | Alshina et al. | |
| 2011/0249737 | A1 | 10/2011 | Joshi et al. | |
| 2012/0008686 | A1 | 1/2012 | Haskell | |
| 2012/0134425 | A1 | 5/2012 | Kossentini et al. | |
| 2012/0183068 | A1 | 7/2012 | Lou et al. | |
| 2012/0224639 | A1 | 9/2012 | Lou et al. | |
| 2012/0230407 | A1 | 9/2012 | Minoo et al. | |
| 2012/0230413 | A1 | 9/2012 | Lou et al. | |
| 2012/0328020 | A1 | 12/2012 | Lou et al. | |
| 2013/0003841 | A1 | 1/2013 | Minoo et al. | |
| 2013/0114677 | A1 | 5/2013 | Baylon et al. | |
| 2013/0182780 | A1 | 7/2013 | Alshin et al. | |
| 2014/0050264 | A1 | 2/2014 | He et al. | |
| 2014/0078394 | A1 | 3/2014 | Lou et al. | |
| 2014/0233634 | A1 | 8/2014 | Alshina et al. | |
| 2014/0307774 | A1 * | 10/2014 | Minoo | H04N 19/70 375/240.02 |

FOREIGN PATENT DOCUMENTS

| | | |
|---|---|---|
| EP | 1973350 | 9/2008 |
| WO | WO2004006558 | 1/2004 |
| WO | WO2006006609 | 1/2006 |
| WO | WO2007011189 | 1/2007 |
| WO | WO2010039288 | 4/2010 |
| WO | 2011046587 A1 | 4/2011 |

OTHER PUBLICATIONS

Chujoh, T., et al., Core Experiment 3: Motion Compensation Interpolation, JCTVC-E703r3, Apr. 11, 2011.

H.26L Test Model Long Term No. 3 (TML-3) Draft 0, ITU-T Telecommunication Standardization Sector of ITU; May 16, 2000, pp. 1-24.

ISR & Written Opinion, RE: Application # PCT/US2012/028467; May 22, 2012.

ISR & Written Opinion, RE: Application # PCT/US2012/045297; Oct. 2, 2012.

ISR and Written Opinion of the International Searching Authority, for Int'l Application No. PCT/US2012/021912; Mar. 12, 2012.

ISR, "ISR Search Report and Written Opinion of the International Searching Authority" for International Application No. ISR/US2013/056017 dated Oct. 15, 2013, 13 pages.

ISR, & Written Opinion of the International Searching Authority for InternationalApplication No. ISR/US2012/027213,May 2, 2012, 11 pages.

ISR, & Written Opinion of the International Searching Authority for InternationalApplication No. ISR/US2012/027227,May 2, 2012, 13 pages.

Ji et al., "Block-Wise Adaptive Motion Accuracy Based B-Picture Coding With Low-Complexity Motion Compensation," IEEE Transactions on Circuits and Systems for Video Technology; vol. 17, No. 8; Aug. 1, 2007; pp. 1085-1090.

Lou_J et al.: "New DCT-based interpolation filters", 95. MPEG Meeting; Daegu; (Motion Picture Expert Group or ISO/IEC JTC1/SC29NVG11), No. m19007, JCTVC-D246 Jan. 20, 2011, section 3.

Lou J. et al., "Motorola Mobility's adaptive interpolation filter" MPEG Meeting: Geneva, Mar. 16, 2011.

Sato K. et al.; "Adaptive MC interpolation for memory access reduction in JVT video coding," Seventh International Symposium on Signal Processing and its Applications; vol. 1; Jul. 1, 2003; pp. 77-80.

Wedi T et al.: "Motion-and aliasing-compensated prediction for hybrid video coding", IEE Transactions on Circuits and Systems for video Technology, IEE Service Center, Piscataway, NJ, US,vol. 13, No. 7, Jul. 1, 2003, pp. 577-586.

Wedi: "New Results on Adaptive Interpolation Filter", 3, JVT-VC Meeting; 60. MPEG Meeting; Fairfax,US; Joint Collaborative Team of ISO/IEC/JTC1/SC29/WG11 and ITU-T SG.16), No. JVT-0059, May 10, 2002, Sections 1 and 2.

Xiong L.: "Spatial upsampling filter," 17, JVT Meeting; 74. Mpeg Meeting; Oct. 14, 2005; Nice, FR (Joint Video Team of ISO/IEC JTC1/SC29/WG11 and ITU-T SG16_, No. JVT-Q051, Oct. 11, 2005, all pages.

(56) References Cited

OTHER PUBLICATIONS

Yoshino T., et al.; "Enhanced switching of interpolation filter for HEVC," Motion Picture Expert Group or ISO/IEC; Oct. 28, 2010.
SATO, "Adaptive MC Interpolation Filter for Complexity Reduction," JVT Meeting; Fairfax, US; May 10, 2002.
Wiegand, et al.; "Overview of the H264/AVC video coding standard," IEEE Transactions on Circuits and Systems for Video Technology; vol. 13; No. 7; Jul. 1, 2003; pp. 560-576.
PCT Search Report & Written Opinion, RE: Application #PCT/US2012/044039; Nov. 12, 2012.

* cited by examiner

SELECTION OF PHASE OFFSETS FOR INTERPOLATION FILTERS FOR MOTION COMPENSATION

CROSS REFERENCE TO RELATED APPLICATIONS

The present application claims priority to:

U.S. Provisional App. No. 61/501,150 for "Efficient Sub-pixel Interpolation Filters for Motion Compensation" filed Jun. 24, 2011;

U.S. Provisional App. No. 61/502,316 for "Slice-Type Dependent Interpolation Filters for Motion Compensation" filed Jun. 28, 2011;

U.S. Provisional App. No. 61/504,159 for "Method for Very Low Complexity Fractional Pixel Interpolation Filters" filed Jul. 1, 2011;

U.S. Provisional App. No. 61/506,611 for "Sub-pixel Interpolation Filters with Adaptive Phase Offset and Frequency Selection for Motion Compensation" filed Jul. 11, 2011;

U.S. Provisional App. No. 61/535,939 for "New Fractional Pixel Interpolation Filters" filed Sep. 16, 2011;

U.S. Provisional App. No. 61/536,494 for "New 7-Tap Fractional Pixel Interpolation Filters" filed Sep. 19, 2011; and U.S. Provisional App. No. 61/557,420 for "Sub-pixel Motion Compensation Interpolation Filters with Adaptive Phase Offset Derived from Statistical Distribution of Motion Vector for a Given Motion Vector Predictor" filed Nov. 9, 2011, the contents of all of which are incorporated herein by reference in their entirety.

BACKGROUND

High-efficiency video coding (HEVC) is a block-based hybrid spatial and temporal predictive coding scheme. Similar to other video coding standards, such as motion picture experts group (MPEG)-1, MPEG-2, and MPEG-4, HEVC supports intra-picture, such as I picture, and inter-picture, such as B picture. In HEVC, P and B pictures are consolidated into a general B picture that can be used as a reference picture.

Intra-picture is coded without referring to any other pictures. Thus, only spatial prediction is allowed for a coding unit (CU)/prediction unit (PU) inside an intra-picture. Inter-picture, however, supports both intra- and inter-prediction. A CU/PU in an inter-picture may be either spatially or temporally predictive coded. Temporal predictive coding may reference pictures that were previously coded.

Temporal motion prediction is an effective method to increase the coding efficiency and provides high compression. HEVC uses a translational model for motion prediction. According to the translational model, a prediction signal for a given block in a current picture is generated from a corresponding block in a reference picture. The coordinates of the reference block are given by a motion vector that describes the translational motion along horizontal (x) and vertical (y) directions that would be added/subtracted to/from the coordinates of the current block. A decoder needs the motion vector to decode the compressed video.

The pixels in the reference frame are used as the prediction. In one example, the motion may be captured in integer pixels. However, not all objects move with the spacing of integer pixels (also referred to as pel). For example, since an object motion is completely unrelated to the sampling grid, sometimes the object motion is more like sub-pel (fractional) motion than a full-pel one. Thus, HEVC allows for motion vectors with sub-pel accuracy.

In order to estimate and compensate sub-pel displacements, the image signal on these sub-pel positions is generated by an interpolation process. In HEVC, sub-pel interpolation is performed using finite impulse response (FIR) filters. Generally, the filter may have 8 taps to determine the sub-pel values for sub-pel positions, such as half-pel and quarter-pel positions. The taps of an interpolation filter weight the integer pixels with coefficient values to generate the sub-pel signals. Different coefficients may produce different compression performance in signal distortion and noise.

In one example, the coefficients for the filter are fixed and applicable to compression of all sequences. In another example, the filter choice may vary from sequence to sequence, within a sequence, from picture to picture, from reference to reference, or within a picture, from PU to PU. This is referred to as an adaptive interpolation filter (AIF). In both the fixed and adaptive interpolation filter schemes, a phase offset spacing of sub-pel pixel values is uniform. For example, the offsets may correspond to quarter, half, and three quarter pixel offsets. FIG. 1 shows an example of a quarter-pel resolution. As shown, sub-pel pixels between a phase offset 0 and phase offset 1 (the integer pixels) are at the ¼, ½, and ¾ phase offsets.

SUMMARY

In one embodiment, a method for encoding or decoding video content is provided. The method determines a plurality of sets of interpolation filters for use in interpolating sub-pel pixel values for a temporal prediction process of video content. Different sets of interpolation filters include different phase offset characteristics. A unit of video content is received. The method then selects one of the set of interpolation filters to interpolate a set of sub-pel pixel values for use in the temporal prediction process for the unit of video content based on characteristics associated with the encoding or decoding of the video content. The one of the set of interpolation filters is selected based on the phase offset characteristic of the one of the set of interpolation filters and the characteristics associated with the encoding or decoding.

In one embodiment, an apparatus is configured to encode or decode video content, the apparatus comprising: one or more computer processors; and a computer-readable storage medium comprising instructions, that when executed, control the one or more computer processors to be operable to: determining a plurality of sets of interpolation filters for use in interpolating sub-pel pixel values for a temporal prediction process of video content, wherein different sets of interpolation filters include different phase offset characteristics; receiving a unit of video content; and selecting one of the set of interpolation filters to interpolate a set of sub-pel pixel values for use in the temporal prediction process for the unit of video content based on characteristics associated with the encoding or decoding of the video content, wherein the one of the set of interpolation filters is selected based on the phase offset characteristic of the one of the set of interpolation filters and the characteristics associated with the encoding or decoding.

The following detailed description and accompanying drawings provide a more detailed understanding of the nature and advantages of the present invention.

DETAILED DESCRIPTION

Figure 1:
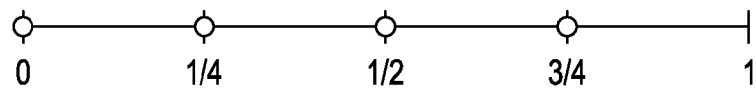
FIG. 1 shows an example of a quarter-pel resolution.
Figure 2:
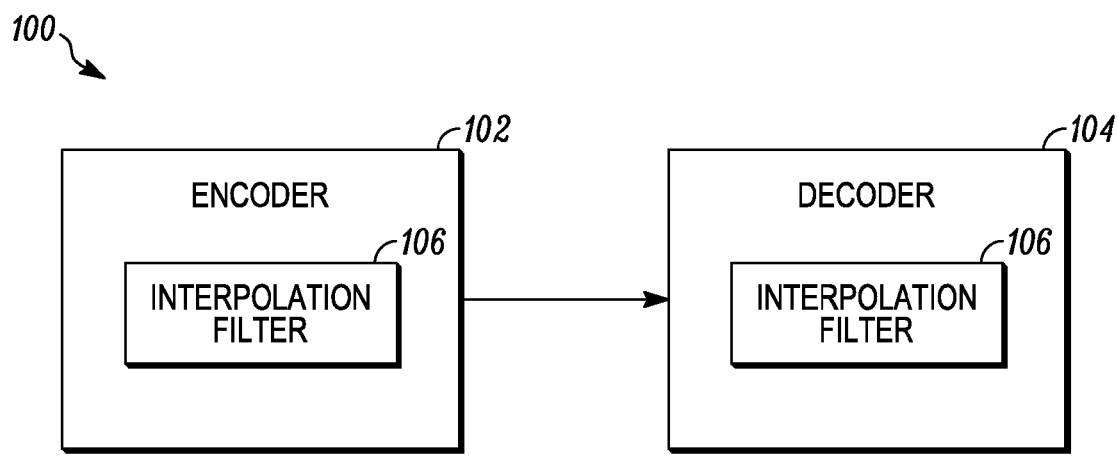
FIG. 2 depicts an example of a system for encoding and decoding video content according to one embodiment.

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.
Overview FIG. 2 depicts an example of a system 100 for encoding and decoding video content according to one embodiment. System 100 includes an encoder 102 and a decoder 104, both of which will be described in more detail below. Encoder 102 and decoder 104 perform temporal prediction through motion estimation and motion compensation. Motion estimation is a process of determining a motion vector (MV) for a current unit of video. Motion compensation is applying the motion vector to the current unit. For example, the temporal prediction searches for a best match prediction for a current prediction unit (PU) over reference pictures. The best match prediction is described by the motion vector and associated reference picture ID. Also, a PU in a B picture may have up to two motion vectors.

The temporal prediction allows for fractional (sub-pel) picture accuracy. Sub-pel prediction is used because motion during two instances of time (the current and reference frames' capture times) can correspond to a sub-pel position in pixel coordinates and generation of different prediction data corresponding to each sub-pel position allows for the possibility of conditioning the prediction signal to better match the signal in the current PU.

Interpolation filters 106 are designed to be linear phase with unit gain. A constant (unity) gain and linear phase properties are required to make sure interpolation filters 106 do not distort the signal. However, it may not be possible to have constant unity gain or perfect linear phase shift for all frequencies. Thus, interpolation filter 106 is designed to have the best linear phase filter with an appropriate phase slope or group delay with a closest phase response to unity that is flat and as wide as possible. For given sub-pel position (e.g., a given fractional phase offset), different trade-offs between "flatness" and "wideness" of frequency response result in different sub-pel interpolation filters 106. For example, for natural images, most of a signal is concentrated at low and middle frequencies, and it is generally preferred to have an interpolation filter 106 that is as flat as possible in the low and middle frequencies while the high frequencies may have more fluctuations. When taking into account noise cancellation, it may be preferred for interpolation filters 106 to attenuate frequencies where the noise is dominant Usually, the shape of a noise depends on the picture content and the amount of compression. For example, compression noise for low quantization regimes may be flatter. In one embodiment, to reconcile between signal distortion and noise cancellation, it may be preferred to attenuate only frequencies where noise power is greater than the signal power.

Interpolation filters 106 include taps that weight full-pel pixel values with coefficient values that are used to determine the sub-pel pixel values for different sub-pel pixel positions. When a different interpolation filter 106 is used, the interpolation filter may use different values for coefficients and/or a different number of taps.

To design an interpolation filter 106, particular embodiments allow phase offset characteristics to vary. For example, phase offsets may be non-uniform in spacing and include a different number of phase offsets. A phase offset is an offset of a sub-pel position from a full-pel position. For example, the non-uniform phased offsets may include phase offsets at a ⅛ pixel phase offset, a ½ pixel phase offset, and a ⅞ pixel phase offset in addition to a 0 phase filter that may use the samples without any filtering. Other non-uniform phase offsets may also be appreciated. Uniform phase offsets may also be used and are defined by a resolution, such as a ¼ or ⅛ pel resolution. This allows design of different interpolation filters 106 to balance between the flatness and wideness that is required. Conventionally, a fixed resolution of offsets was used, such as phase offsets that correspond to quarter, half, and three-quarter pixel offsets. For example, uniform phase offsets may be ¼, ½, and ¾ offsets where the uniform spacing is ¼ pixels. However, a problem with a uniform distribution of sub-pel positions is that these uniform sub-pel positions may not be optimal for a given set of filter restrictions, such as a number of taps or a power spectral density of the PU.

In one embodiment, the phase offsets for sub-pel positions may be determined based on characteristics of the encoding or decoding process. For example, the characteristics may be statistical information from video content, such as broadcast video, being encoded or decoded. Additionally, the characteristics may be a coding condition, such as properties of interpolation filter 106, a type of prediction (e.g., from one reference block or from many reference blocks), and/or the compression noise statistical characteristics. Also, optimal sub-pel positions may require different phase offsets in a vertical dimension and/or a horizontal dimension. Thus, different sets of interpolation filters 106 may be selected based on different characteristics of the encoding or decoding process.

Figure 3A:
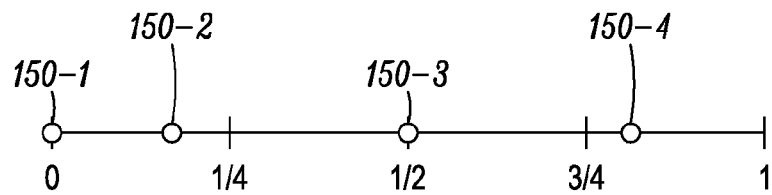
FIGS. 3A-3D depicts a first example of selecting phase offsets according to one embodiment.

The following show different examples of phase offsets. The resolution may be a quarter-pel resolution with four sub-pel values. FIG. 3A depicts a first example of selecting phase offsets according to one embodiment. As shown, phase offsets 150 are not uniformly spaced. For example, phase offsets 150-2 and 150-4 are offset from the ¼ pel and ¾ pel offsets causing a non-uniform spacing.

Figure 3B:
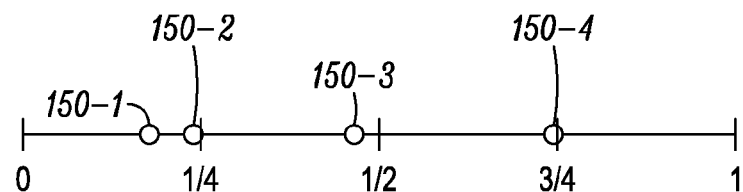

FIG. 3B depicts a second example of selecting phase offsets according to one embodiment. As shown, phase offsets 150 are not uniformly spaced. For example, phase offsets 150-1 and 150-3 are offset from the 0 pel and ½ pel offsets causing a non-uniform spacing.

Figure 3C:
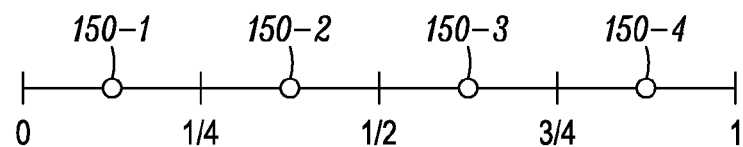

FIG. 3C depicts a third example of selecting phase offsets according to one embodiment. In this example, phase offsets 150 are uniformly spaced. However, phase offsets 150-1-150-4 are offset from the ¼ pel resolution. For example, phase offsets 150-1-150-4 are offset in between the 0 and ¼ pel, ¼ pel and ½ pel, ½ pel and ¾ pel, and ¾ pel and 1 pel offsets, respectively. For example, the offsets may be ⅛ pel, ⅜ pel, ⅝ pel, ⅞ pel. Although these phase offsets are uniformly spaced, interpolation filter 106 includes no zero phase offset.

Figure 3D:
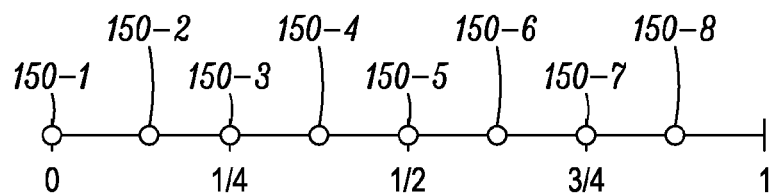

FIG. 3D depicts a fourth example of selecting phase offsets according to one embodiment. As shown, phase offsets 150 are uniformly spaced. However, phase offsets 150-1-150-8 are offset from the ¼ pel resolution. For example, phase offsets 150-1-150-8 are offset at a ⅛ pel spacing. Also, the number of sub-pel pixel positions are increased for the four sub-pel pixel positions that are normally attributed to a ¼ pel resolution.

Figures 4A, 4B:
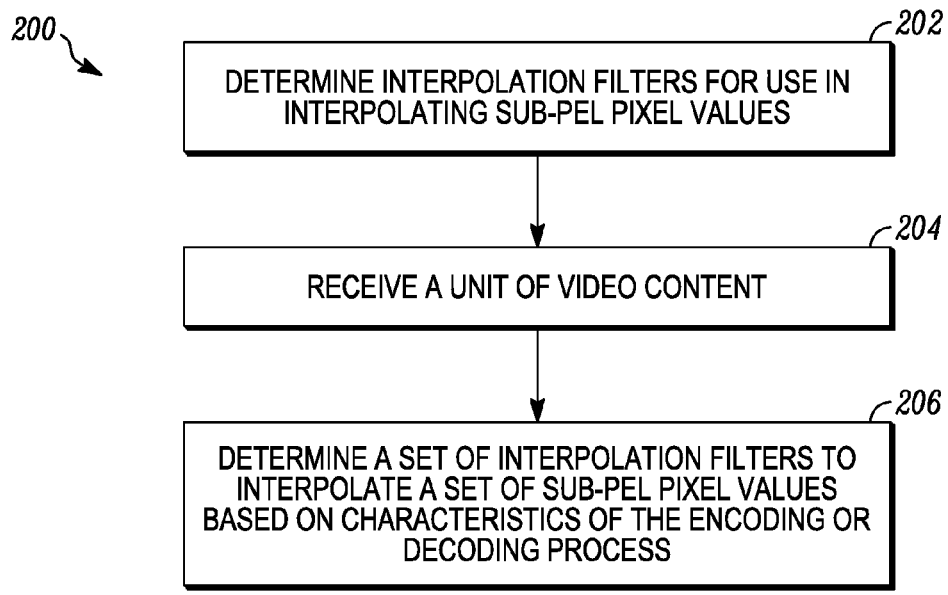
FIG. 4A depicts a simplified flowchart for a method of encoding or decoding video content according to one embodiment.
FIG. 4B depicts a simplified flowchart for interpolating sub-pel pixel values according to one embodiment.

FIG. 4A depicts a simplified flowchart 200 for a method of encoding or decoding video content according to one embodiment. The method may be a general method to determine an interpolation filter 106. More detailed examples of determining interpolation filters 106 are described below. At 202, interpolation filters 106 for use in interpolating sub-pel pixel values for a temporal prediction process of video content are determined For example, different sets of interpolation filters include different phase offset characteristics are determined At 204, a unit of video content is received. For example, a PU is being encoded or decoded. At 206, a set of interpolation filters 106 is determined to interpolate a set of sub-pel pixel values for use in the temporal prediction process for the PU. Interpolation filter 106 may be determined based on characteristics of the encoding or decoding process. For example, the video content being encoded or decoded or a coding condition may be considered as will be described in more detail below. In one embodiment, the set of sub-pel pixel values have non-uniform phase offset spacing between the set of sub-pel pixel values.

FIG. 4B depicts a simplified flowchart 300 for interpolating sub-pel pixel values according to one embodiment. At 302, interpolation filter 106 is determined that includes a set of taps for interpolating a sub-pel pixel position. The set of taps correspond to full-pel pixel positions. At 304, a set of full-pel pixel values for pixels for video content is determined. At 306, the set of full-pel pixel values is applied to the set of taps to interpolate a sub-pel pixel value corresponding to a sub-pel pixel position. For example, coefficients associated with each of the taps are applied to full-pel values. The results for each tap are averaged. At 308, the sub-pel pixel value is output for use in performing motion compensation for a unit of video content. Multiple sub-pel values may be determined using the same or different interpolation filters 106.

In one embodiment, fixed phase offsets that are non-uniform may be used. The fixed phase offsets may be used for all sequences of video being encoded or decoded. As will be described in more detail below, adaptive selection of phase offsets may also be used. In this case, non-uniform phase offsets may dynamically change during the encoding or decoding process.

Non-Uniform and Shifted Phase Offsets for Interpolation Filters

Different examples of fixed non-uniform phase offsets will now be described. The fixed-phase offsets may be used for all sequences of video being coded.

Figure 5:
FIG. 5 depicts positions of sub-pel pixels between full-pel pixels along a pixel line within an image according to one embodiment.
Figure 5:
Figure 5:
Figure 5:
Figure 5:
Figure 5:
Figure 5:

The following provides examples of sub-pel interpolation filters 106 with fixed non-uniform phase offsets. Examples are based on three sub-pel positions (excluding the 0 phase offset) or a four sub-pel pixel position (with no 0 phase offset). The number of taps and coefficient values may be varied. FIG. 5 depicts positions of sub-pel pixels between full-pel pixels along a pixel line within an image according to one embodiment. For example, the pixel line may be along a row or column of an image. Full-pel pixels are represented by integer pixels and are shown in FIG. 3 as pixels L3, L2, L1, L0, R0, R1, R2, and R3. Sub-pel pixels F1, F2, and F3 are non-uniform phase offsets for pixel values.

The sub-pel pixels may be interpolated using the values of spatial neighboring full-pel pixels. For example, the sub-pel pixel F1 may be interpolated using the values of full-pel pixels L3, L2, L1, L0, R0, R1, R2, and R3. Different coefficients may also be used to weight the values of the neighboring pixels and provide different characteristics of filtering.

In another example, a fixed, four-position sub-pel interpolation filter 106 includes filter taps with a ⅛ pixel phase offset, a ½ pixel phase offset, a ⅞ pixel phase offset, and a 0 phase filter that may use the samples without any filtering. A second example of a fixed, four-position, sub-pel interpolation filter 106 may include filter taps at a 3/16 pixel phase offset, ½ pixel phase offset, 13/16 pixel phase offset, and a 0 phase filter that may use the samples without any filtering. In a third example, a fixed, four-position, sub-pel interpolation filter 106 includes filter taps with a ⅛ pixel phase offset, ⅜ pixel phase offset, ⅝ pixel phase offset, and ⅞ pixel phase offset. This shifts the phase offsets, but maintains a uniform spacing.

EXAMPLE 1

Example 1 is for a fixed sub-pixel interpolation scheme with 8 taps and representative sub-pixel offsets at 3/16 (F1), ½ (F2), and 13/16 (F3). F1, F2 and F3, are interpolated using the values of spatial neighboring full-pel pixels, L3, L2, L1, L0, R0, R1, R2, and R3, as follows, $$F1=(-1*L3+3*L2-8*L1+60*L0+14*R0-6*R1+3*R2-1*R3+32)>>6;$$

$$F2=(-1*L3+4*L2-11*L1+40*L0+40*R0-11*R1+4*R2-1*R3+32)>>6;$$

$$F3=(-1*L3+3*L2-6*L1+14*L0+60*R0-8*R1+3*R2-1*R3+32)>>6;$$

A coefficient value is applied to each full-pel pixel value, such as the coefficient "−1" is applied to the L3 pixel value. Table 1 summarizes the filter coefficients.

TABLE 1

| sub-pel pixel interpolation filter coefficients | |
|---|---|
| POSITION | COEFFICIENTS |
| F1 | {−1, 3, −8, 60, 14, −6, 3, −1,} |
| F2 | {−1, 4, −11, 40, 40, −11, 4, −1,} |
| F3 | {−1, 3, −6, 14, 60, −8, 3, −1,} |

EXAMPLE 2

Example 2 is for a fixed sub-pixel interpolation scheme with 6 taps for sub-pel phase offset F1. 8 taps for sub-pel phase offset F2, and 6 taps for sub-pel phase offset F3 with representative sub-pixel positions at 3/16 (F1), 1/2(F2) and 13/16(F3). F1, F2 and F3, are interpolated using the values of spatial neighboring full-pel pixels, L3, L2, L1, L0, R0, R1, R2, and R3, as follows, $$F1=(-1*L3+4*L2-10*L1+62*L0+11*R0-2*R1+0*R2-0*R3+32)>>6;$$

$$F2=(0*L3+2*L2-9*L1+39*L0+39*R0-9*R1+2*R2-0*R3+32)>>6;$$

$$F3=(0*L3+0*L2-2*L1+11*L0+62*R0-10*R1+4*R2-1*R3+32)>>6;$$

Table 2 summarizes the filter coefficients. In practical implementation, any operation with a zero coefficient could be skipped, such as the operation of "0*Rx" or "0*Ly" could be skipped. That is, in this case, only a 6-tap interpolation filter is needed. Table 2 summarizes the filter coefficients.

TABLE 2 sub-pel pixel interpolation filter coefficients

| POSITION | COEFFICIENTS |
| --- | --- |
| F1 | {−1, 4, −10, 62, 11, −2, 0, 0,} |
| F2 | {0, 2, −9, 39, 39, −9, 2, 0,} |
| F3 | {0, 0, −2, 11, 62, −10, 4, −1,} |

Adaptive Selection of Non-Uniform and Shifted Phase Offsets for Sub-Pel Interpolation Filters In addition to fixed phase offsets, adaptive sub-pel phase offset selections may be used to change the number of offsets or spacing between offsets. In this case, different interpolation filters 106 may be used to determine the sub-pel pixel values. In one embodiment, implicit signaling and explicit signaling may be used. Implicit signaling is where encoder 102 and decoder 104 determine interpolation filter 106 independently without signaling. For example, characteristics of the encoding or decoding process may be used to determine interpolation filter 106 separately. Explicit signaling is where encoder 102 determines interpolation filter 106 and explicitly signals the selection to decoder 104.

Figure 6:
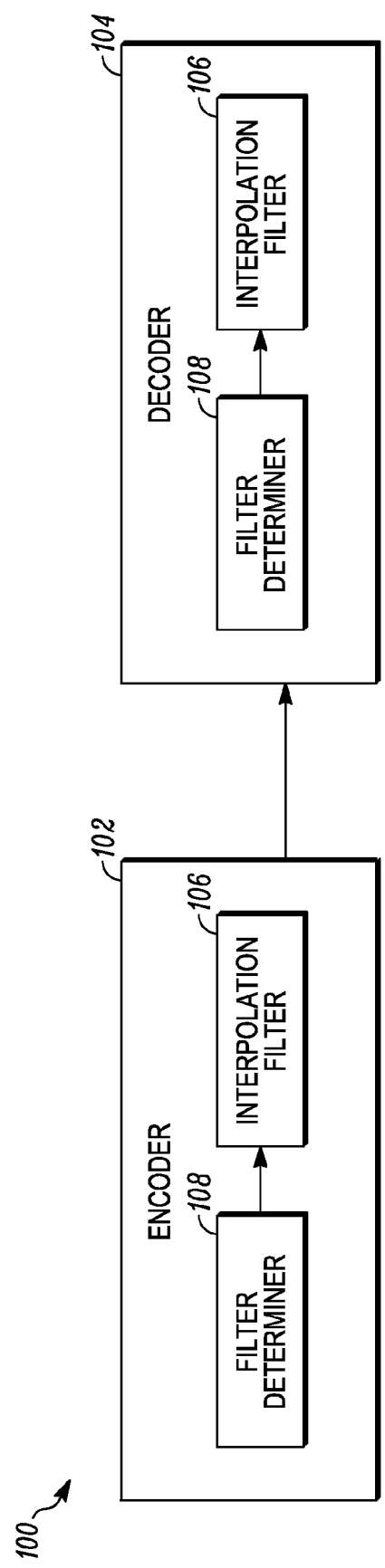
FIG. 6 depicts an example of the system for performing adaptive interpolation filter selection using implicit signaling according to one embodiment.

Encoder 102 and decoder 104 need to know which interpolation filter 106 to use in encoding and decoding a unit of video content, such as a PU. Particular embodiments may use an implicit signaling method for determining which interpolation filter 106 to use to interpolate sub-pel pixel values. In one embodiment, information already available to both encoder 102 and decoder 104 is used to determine which interpolation filter 106 to use. FIG. 6 depicts an example of system 100 for performing adaptive interpolation filter selection using implicit signaling according to one embodiment. For example, a filter determiner 108 in either encoder 102 or decoder 104 receives a set of interpolation filters with mappings between the interpolation filters 106 and coding parameters used in the compression process. For example, the set of interpolation filters 106 may be installed or stored in memory of encoder 102 and decoder 104. Filter determiner 108 uses the coding parameter used in the compression process to determine an interpolation filter 106 based on the mapping. The mappings may be already known to encoder 102 and decoder 104 before the encoding of PU or decoding of bits for the PU. Because encoder 102 and decoder 104 use information already known to encoder 102 or decoder 104 to determine the appropriate interpolation filter 106, the interpolation filter decision is implicitly determined without requiring explicit communication between encoder 102 and decoder 104 for encoding and decoding the unit of video content.

Filter determiner 108 uses characteristics associated with the encoding or decoding process to determine sub-pel motion phase offsets. For example, the characteristics may include a size of the PU, the existence of loop filters, a type of slice, a number of reference blocks for prediction, and other information to improve the efficiency of sub-pixel motion compensation. Filter determiner 108 in encoder 102 and filter determiner 108 in decoder 104 may analyze the characteristics and determine the same interpolation filter 106.

Figure 7:
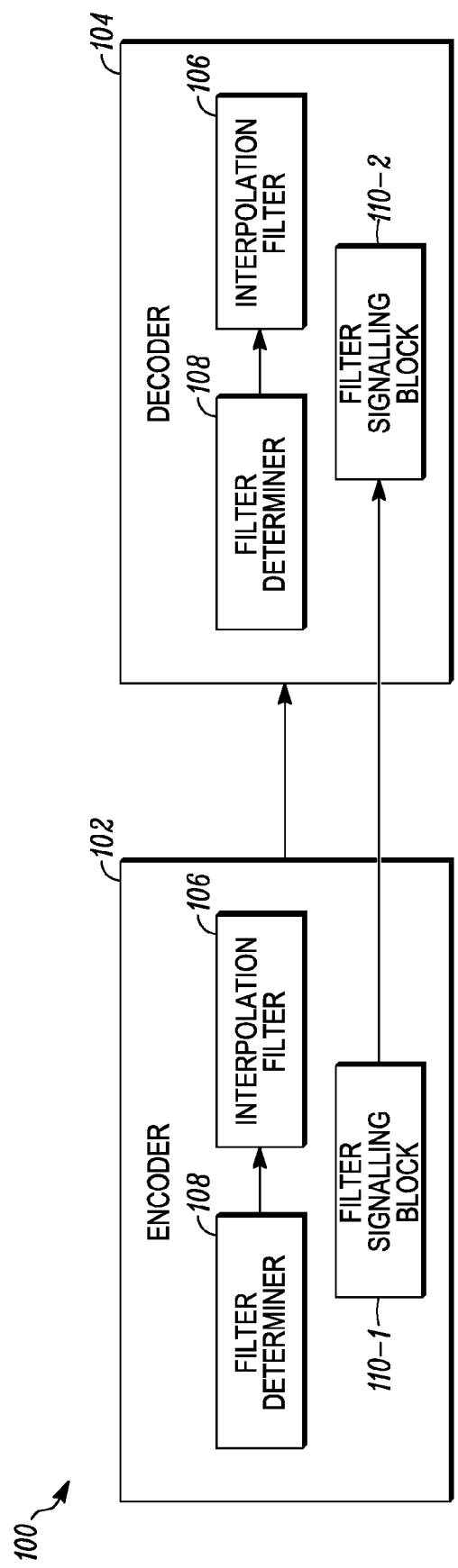
FIG. 7 shows an example of the system when an explicit communication from an encoder to a decoder is used to determine which interpolation filter to use according to one embodiment.

Although the implicit signaling method may be used, it may be useful to explicitly have communication between encoder 102 and decoder 104 at certain times. For example, FIG. 7 shows an example when an explicit communication from encoder 102 to decoder 104 is used to determine which interpolation filter 106 to use according to one embodiment. In one example as shown in FIG. 7, a filter signaling block 110-1 in encoder 102 may communicate a filter signaling block 110-2 in decoder 104. The communication between encoder 102 and decoder 104 may vary, such as the communications may be the mappings themselves, an update to the mappings, or information for use in determining which interpolation filter 106 to use based on the mappings. The explicit signaling may be communicated using high level syntax(es) in a sequence, picture, or slice header. The signaling may be performed during an effective period of the high level syntax(es).

The characteristics associated with the encoding or decoding process may change from sequence-to-sequence or from frame-to-frame for a sequence, or even within a frame, and thus explicit signaling to communicate which phase offsets are selected per sequence, picture, slice, or CU may be used. For example, the explicit signaling may be performed through sequence header information, through picture parameter set, through a slice header, or by setting a flag.

Filter signaling block 110-1 of encoder 102 may send the selection of which interpolation filter 106 with non-uniform phase offsets to filter signaling block 110-2 of decoder 104. The following describes different examples of adaptive interpolation filter 106 selection.

EXAMPLE 1

Example 1 is for a PU size adaptive non-uniform fixed sub-pixel interpolation filter 106 with 4 taps and representative sub-pixel positions at 3/16, 1/2 and 13/16. The adaptive determination is based on PU size. If PU size is smaller than 8×8 (This includes 4×4, 4×8 and 8×4 sizes), phase offsets F1 and F3 are interpolated using the values of spatial neighboring full-pel pixels, L3, L2, L1, L0, R0, R1, R2, and R3, as follows, $$F1=(0*L3+0*L2-5*L1+59*L0+14*R0-4*R1+0*R2+0*R3+32)>>6;$$

$$F3=(0*L3+0*L2-4*L1+14*L0+59*R0-5*R1+0*R2+0*R3+32)>>6;$$

EXAMPLE 2

Example 2 is example for a PU size adaptive non-uniform fixed sub-pixel interpolation filter 106 with 4 taps and representative sub-pixel positions at 3/16, 1/2 and 13/16. If PU size is smaller than 8×8 (This includes 4×4, 4×8 and 8×4), phase offsets F1 and F3 are interpolated using the values of spatial neighboring full-pel pixels, L3, L2, L1, L0, R0, R1, R2, and R3, as follows, $$F1=(0*L3+0*L2-5*L1+59*L0+13*R0-3*R1+0*R2+0*R3+32)>>6;$$

$$F3=(0*L3+0*L2-3*L1+13*L0+59*R0-5*R1+0*R2+0*R3+32)>>6;$$

EXAMPLE 3

Example 3 is for a PU size adaptive non-uniform fixed sub-pixel interpolation grid with combination of 4 and 8 taps and representative sub-pixel positions at 3/16, 1/2 and 13/16. If PU size is smaller than 8×8 (This includes 4×4, 4×8 and 8×4), phase offsets F1 and F3 are interpolated using the values of spatial neighboring full-pel pixels, L3, L2, L1, L0, R0, R1, R2, and R3, as follows, $$F1=(0*L3+0*L2-5*L1+59*L0+14*R0-4*R1+0*R2+0*R3+32)>>6;$$

$$F3=(0*L3+0*L2-4*L1+14*L0+59*R0-5*R1+0*R2+0*R3+32)>>6;$$

If PU size is larger than or equal to 8×8, phase offsets F1 and F3 are interpolated using the values of spatial neighboring full-pel pixels, L3, L2, L1, L0, R0, R1, R2, and R3, as follows, $$F1=(-1*L3+4*L2-10*L1+57*L0+19*R0-7*R1+3*R2-1*R3+32)>>6;$$

$$F3=(-1*L3+3*L2-7*L1+19*L0+57*R0-10*R1+4*R2-1*R3+32)>>6;$$

EXAMPLE 4

Example 4 is for a PU size adaptive non-uniform fixed sub-pixel interpolation grid with combination of 4 and 7 taps and representative sub-pixel positions at 3/16, 1/2 and 13/16. If PU size is smaller than 8×8 (This includes 4×4, 4×8 and 8×4), phase offsets F1 and F3 are interpolated using the values of spatial neighboring full-pel pixels, L3, L2, L1, L0, R0, R1, R2, and R3, as follows, $$F1=(0*L3+0*L2-5*L1+59*L0+14*R0-4*R1+0*R2+0*R3+32)>>6;$$

$$F3=(0*L3+0*L2-4*L1+14*L0+59*R0-5*R1+0*R2+0*R3+32)>>6;$$

If PU size is larger than or equal to 8×8, phase offsets F1 and F3, are interpolated using the values of spatial neighboring full-pel pixels, L3, L2, L1, L0, R0, R1, R2, and R3, as follows, $$F1=(0*L3+0*L2-5*L1+60*L0+13*R0-4*R1+0*R2+0*R3+32)>>6;$$

$$F3=(0*L3+0*L2-4*L1+13*L0+60*R0-8*R1+3*R2+0*R3+32)>>6;$$

EXAMPLE 5

Example 5 is for a PU size adaptive non-uniform fixed sub-pixel interpolation grid with combination of 4 and 8 taps and representative sub-pixel positions at 3/16, 1/2 and 13/16. If PU size is smaller than 8×8 (This includes 4×4, 4×8 and 8×4), phase offsets F1 and F3 are interpolated using the values of spatial neighboring full-pel pixels, L3, L2, L1, L0, R0, R1, R2, and R3, as follows, $$F1=(0*L3+0*L2-5*L1+59*L0+14*R0-4*R1+0*R2+0*R3+32)>>6;$$

$$F3=(0*L3+0*L2-4*L1+14*L0+59*R0-5*R1+0*R2+0*R3+32)>>6;$$

If PU size is larger than or equal to 8×8, phase offsets F1 and F3, are interpolated using the values of spatial neighboring full-pel pixels, L3, L2, L1, L0, R0, R1, R2, and R3, as follows, $$F1=(-1*L3+3*L2-8*L1+60*L0+14*R0-6*R1+3*R2-1*R3+32)>>6;$$

$$F3=(-1*L3+3*L2-6*L1+14*L0+60*R0-8*R1+3*R2-1*R3+32)>>6;$$

EXAMPLE 6

Example 6 is for a PU size adaptive non-uniform fixed sub-pixel interpolation grid with combination of 4 and 8 taps and representative sub-pixel positions at 3/16, 1/2 and 13/16. If PU size is smaller than 8×8 (This includes 4×4, 4×8 and 8×4), phase offsets F1 and F3, are interpolated using the values of spatial neighboring full-pel pixels, L3, L2, L1, L0, R0, R1, R2, and R3, as follows, $$F1=(0*L3+0*L2-5*L1+59*L0+13*R0-3*R1+0*R2+0*R3+32)>>6;$$

$$F3=(0*L3+0*L2-3*L1+13*L0+59*R0-5*R1+0*R2+0*R3+32)>>6;$$

If PU size is larger than or equal to 8×8, phase offsets F1 and F3, are interpolated using the values of spatial neighboring full-pel pixels, L3, L2, L1, L0, R0, R1, R2, and R3, as follows, $$F1-(-1*L3+4*L2-10*L1+57*L0+19*R0-7*R1+3*R2-1*R3+32)>>6;$$

$$F3-(-1*L3+3*L2-7*L1+19*L0+57*R0-10*R1+4*R2-1*R3+32)>>6;$$

EXAMPLE 7

Example 7 is for a PU size adaptive non-uniform fixed sub-pixel interpolation grid with combination of 4 and 7 taps and representative sub-pixel positions at 3/16, 1/2 and 13/16. If PU size is smaller than 8×8 (This includes 4×4, 4×8 and 8×4), phase offsets F1 and F3, are interpolated using the values of spatial neighboring full-pel pixels, L3, L2, L1, L0, R0, R1, R2, and R3, as follows, $$F1=(0*L3+0*L2-5*L1+59*L0+13*R0-3*R1+0*R2+0*R3+32)>>6;$$

$$F3=(0*L3+0*L2-3*L1+13*L0+59*R0-5*R1+0*R2+0*R3+32)>>6;$$

If PU size is larger than or equal to 8×8, phase offsets F1 and F3, are interpolated using the values of spatial neighboring full-pel pixels, L3, L2, L1, L0, R0, R1, R2, and R3, as follows, $$F1=(-1*L3+3*L2-8*L1+60*L0+13*R0-4*R1+1*R2+0*R3+32)>>6;$$

$$F3=(0*L3+1*L2-4*L1+13*L0+60*R0-8*R1+3*R2-1*R3+32)>>6;$$

EXAMPLE 8

Example 8 is for a PU size adaptive non-uniform fixed sub-pixel interpolation grid with combination of 4 and 8 taps and representative sub-pixel positions at 3/16, 1/2 and 13/16. If PU size is smaller than 8×8 (This includes 4×4, 4×8 and 8×4), phase offsets F1 and F3 are interpolated using the values of spatial neighboring full-pel pixels, L3, L2, L1, L0, R0, R1, R2, and R3, as follows, $$F1=(0*L3+0*L2-5*L1+59*L0+13*R0-3*R1+0*R2+0*R3+32)>>6;$$

$$F3=(0*L3+0*L2-3*L1+13*L0+59*R0-5*R1+0*R2+0*R3+32)>>6;$$

If PU size is larger than or equal to 8×8, phase offsets F1 and F3, are interpolated using the values of spatial neighboring full-pel pixels, L3, L2, L1, L0, R0, R1, R2, and R3, as follows, $F1=(-1*L3+3*L2-8*L1+60*L0+14*R0-6*R1+3*R2-1*R3+32)>>6;$ $F3=(-1*L3+3*L2-6*L1+14*L0+60*R0-8*R1+3*R2-1*R3+32)>>6;$

EXAMPLE 9

Example 9 is for a PU size adaptive non-uniform fixed sub-pixel interpolation grid with combination of 8 and 7 taps and representative sub-pixel positions at $3/16$, $1/2$ and $13/16$. If PU size is smaller than 8×8 (This includes 4×4, 4×8 and 8×4), phase offsets F1 and F3 are interpolated using the values of spatial neighboring full-pel pixels, L3, L2, L1, L0, R0, R1, R2, and R3, as follows, $F1=(-1*L3+3*L2-8*L1+60*L0+14*R0-6*R1+3*R2-1*R3+32)>>6;$ $F3=(-1*L3+3*L2-6*L1+14*L0+60*R0-8*R1+3*R2-1*R3+32)>>6;$ If PU size is larger than or equal to 8×8, phase offsets F1 and F3, are interpolated using the values of spatial neighboring full-pel pixels, L3, L2, L1, L0, R0, R1, R2, and R3, as follows, $F1=(-1*L3+3*L2-8*L1+60*L0+13*R0-4*R1+1*R2+0*R3+32)>>6;$ $F3=(0*L3+1*L2-4*L1+13*L0+60*R0-8*R1+3*R2-1*R3+32)>>6;$

EXAMPLE 10

Example 10 is for a PU size adaptive non-uniform fixed sub-pixel interpolation grid with combination of 8 and 7 taps and representative sub-pixel positions at $3/16$, $1/2$ and $13/16$. If PU size is smaller than 16×16 (This includes 4×4, 4×8, 8×4, 8×8, 16×8 and 8×16), phase offsets F1 and F3 are interpolated using the values of spatial neighboring full-pel pixels, L3, L2, L1, L0, R0, R1, R2, and R3, as follows, $F1=(-1*L3+3*L2-8*L1+60*L0+14*R0-6*R1+3*R2-1*R3+32)>>6;$ $F3=(-1*L3+3*L2-6*L1+14*L0+60*R0-8*R1+3*R2-1*R3+32)>>6;$ If PU size is larger than or equal to 16×16, phase offsets F1 and F3 are interpolated using the values of spatial neighboring full-pel pixels, L3, L2, L1, L0, R0, R1, R2, and R3, as follows, $F1=(-1*L3+3*L2-8*L1+60*L0+13*R0-4*R1+1*R2+0*R3+32)>>6;$ $F3=(0*L3+1*L2-4*L1+13*L0+60*R0-8*R1+3*R2-1*R3+32)>>6;$ Table 3 summarizes the filter coefficients for examples 3-10 that apply different coefficients for different PU sizes.

TABLE 3

PU-size dependent sub- pixel interpolation filter coefficients

| | PU SIZE | POSITION | COEFFICIENTS |
|---|---|---|---|
| EX. 3 | <8 × 8 | F1 | {0, 0, −5, 59, 14, −4, 0, 0,} |
| | | F3 | {0, 0, −4, 14, 59, −5, 0, 0,} |
| | >=8 × 8 | F1 | {−1, 4, −10, 57, 19, −7, 3, −1,} |
| | | F3 | {−1, 3, −7, 19, 57, −10, 4, −1,} |
| EX. 4 | <8 × 8 | F1 | {0, 0, −5, 59, 14, −4, 0, 0,} |
| | | F3 | {0, 0, −4, 14, 59, −5, 0, 0,} |
| | >=8 × 8 | F1 | {−1, 3, −8, 60, 13, −4, 1, 0,} |
| | | F3 | {0, 1, −4, 13, 60, −8, 3, −1,} |
| EX. 5 | <8 × 8 | F1 | {0, 0, −5, 59, 14, −4, 0, 0,} |
| | | F3 | {0, 0, −4, 14, 59, −5, 0, 0,} |
| | >=8 × 8 | F1 | {−1, 3, −8, 60, 14, −6, 3, −1,} |
| | | F3 | {−1, 3, −6, 14, 60, −8, 3, −1,} |
| EX. 6 | <8 × 8 | F1 | {0, 0, −5, 59, 13, −3, 0, 0,} |
| | | F3 | {0, 0, −3, 13, 59, −5, 0, 0,} |
| | >=8 × 8 | F1 | {−1, 4, −10, 57, 19, −7, 3, −1,} |
| | | F3 | {−1, 3, −7, 19, 57, −10, 4, −1,} |
| EX. 7 | <8 × 8 | F1 | {0, 0, −5, 59, 13, −3, 0, 0,} |
| | | F3 | {0, 0, −3, 13, 59, −5, 0, 0,} |
| | >=8 × 8 | F1 | {−1, 3, −8, 60, 13, −4, 1, 0,} |
| | | F3 | {0, 1, −4, 13, 60, −8, 3, −1,} |
| EX. 8 | <8 × 8 | F1 | {0, 0, −5, 59, 13, −3, 0, 0,} |
| | | F3 | {0, 0, −3, 13, 59, −5, 0, 0,} |
| | >=8 × 8 | F1 | {−1, 3, −8, 60, 14, −6, 3, −1,} |
| | | F3 | {−1, 3, −6, 14, 60, −8, 3, −1,} |
| EX. 9 | <8 × 8 | F1 | {−1, 3, −8, 60, 14, −6, 3, −1,} |
| | | F3 | {−1, 3, −6, 14, 60, −8, 3, −1,} |
| | >=8 × 8 | F1 | {−1, 3, −8, 60, 13, −4, 1, 0,} |
| | | F3 | {0, 1, −4, 13, 60, −8, 3, −1,} |
| EX. 10 | <16 × 16 | F1 | {−1, 3, −8, 60, 14, −6, 3, −1,} |
| | | F3 | {−1, 3, −6, 14, 60, −8, 3, −1,} |
| | >=16 × 16 | F1 | {−1, 3, −8, 60, 13, −4, 1, 0,} |
| | | F3 | {0, 1, −4, 13, 60, −8, 3, −1,} |

Table 4 provides some choices for some of the filter coefficients related to particular embodiments. In practical implementation, the operation as "$0*Rx$" or "$0*Ly$" could be skipped.

TABLE 4 sub-pel pixel interpolation filter coefficients

| | Position | Coefficients |
|---|---|---|
| Example 1 | F1 | {−1, 3, −8, 60, 13, −5, 3, −1} |
| | F3 | {−1, 3, −5, 13, 60, −8, 3, −1} |
| Example 2 | F1 | {−1, 3, −9, 60, 14, −5, 3, −1} |
| | F3 | {−1, 3, −5, 14, 60, −9, 3, −1} |
| Example 3 | F1 | {−1, 4, −9, 60, 14, −6, 3, −1} |
| | F3 | {−1, 3, −6, 14, 60, −9, 4, −1} |
| Example 4 | F1 | {−1, 4, −9, 59, 15, −6, 3, −1} |
| | F3 | {−1, 3, −6, 15, 59, −9, 4, −1} |
| Example 5 | F1 | {−1, 4, −10, 59, 16, −6, 3, −1} |
| | F3 | {−1, 3, −6, 16, 59, −10, 4, −1} |
| Example 6 | F1 | {−1, 3, −8, 61, 13, −5, 2, −1} |
| | F3 | {−1, 2, −5, 13, 61, −8, 3, −1} |
| Example 7 | F1 | {−1, 3, −8, 61, 12, −5, 3, −1} |
| | F3 | {−1, 3, −5, 12, 61, −8, 3, −1} |
| Example 8 | F1 | {−1, 3, −7, 61, 12, −5, 2, −1} |
| | F3 | {−1, 2, −5, 12, 61, −7, 3, −1} |
| Example 9 | F1 | {−1, 3, −7, 61, 11, −4, 2, −1} |
| | F3 | {−1, 2, −4, 11, 61, −7, 3, −1} |
| Example 10 | F1 | {−1, 4, −8, 61, 11, −4, 1, 0} |
| | F3 | {0, 1, −4, 11, 61, −7, 3, −1} |
| Example 11 | F1 | {−1, 3, −8, 61, 12, −4, 1, 0} |
| | F3 | {0, 1, −4, 12, 61, −8, 3, −1} |
| Example 12 | F1 | {−1, 4, −9, 61, 12, −4, 1, 0} |
| | F3 | {0, 1, −4, 12, 61, −9, 4, −1} |
| Example 13 | F1 | {−1, 3, −9, 61, 13, −4, 1, 0} |
| | F3 | {0, 1, −4, 13, 61, −9, 3, −1} |
| Example 14 | F1 | {−1, 4, −9, 61, 13, −5, 1, 0} |
| | F3 | {0, 1, −5, 13, 61, −9, 4, −1} |
| Example 15 | F1 | {−1, 4, −9, 60, 13, −4, 1, 0} |
| | F3 | {0, 1, −4, 13, 60, −9, 4, −1} |
| Example 16 | F1 | {−1, 4, −9, 60, 14, −5, 1, 0} |
| | F3 | {0, 1, −5, 14, 60, −9, 4, −1} |
| Example 17 | F1 | {−1, 4, −10, 60, 15, −5, 1, 0} |
| | F3 | {0, 1, −5, 15, 60, −10, 4, −1} |
| Example 18 | F1 | {−1, 4, −10, 59, 15, −5, 2, 0} |
| | F3 | {0, 2, −5, 15, 59, −10, 4, −1} |

TABLE 4-continued sub-pel pixel interpolation filter coefficients

| | Position | Coefficients |
|---|---|---|
| Example 19 | F1 | {−1, 4, −10, 59, 16, −5, 1, 0} |
| | F3 | {0, 1, −5, 16, 59, −10, 4, −1} |
| Example 20 | F1 | {−1, 4, −10, 59, 16, −6, 2, 0} |
| | F3 | {0, 2, −6, 16, 59, −10, 4, −1} |
| Example 21 | F1 | {−1, 4, −10, 59, 17, −6, 1, 0} |
| | F3 | {0, 1, −6, 17, 59, −10, 4, −1} |
| Example 22 | F1 | {−1, 3, −8, 60, 14, −5, 2, −1} |
| | F3 | {−1, 2, −5, 14, 60, −8, 3, −1} |
| Example 23 | F1 | {−1, 4, −10, 62, 11, −2, 0, 0} |
| | F3 | {0, 0, −2, 11, 62, −10, 4, 1} |
| Example 24 | F1 | {0, 0, −4, 56, 17, −8, 4, −1} |
| | F3 | {−1, 4, −8, 17, 56, −4, 0, 0} |
| Example 25 | F1 | {0, 0, −3, 54, 19, −9, 4, −1} |
| | F3 | {−1, 4, −9, 19, 54, −3, 0, 0} |
| Example 26 | F1 | {0, 0, −5, 58, 15, −6, 3, −1} |
| | F3 | {−1, 3, −6, 15, 58, −5, 0, 0} |
| Example 27 | F1 | {0, 0, −5, 59, 14, −4, 0, 0} |
| | F3 | {0, 0, −4, 14, 59, −5, 0, 0} |
| Example 28 | F1 | {0, 0, −5, 59, 13, −3, 0, 0} |
| | F3 | {0, 0, −3, 13, 59, −5, 0, 0} |
| Example 29 | F1 | {−1, 4, −10, 60, 14, −4, 1, 0} |
| | F3 | {0, 1, −4, 14, 60, −10, 4, −1} |
| Example 30 | F1 | {−1, 3, −8, 62, 10, −3, 1, 0} |
| | F3 | {0, 1, −3, 10, 62, −10, 3, −1} |

In the following examples, FL0, FL1, FL2, H, FR2, FR1, and FR0 are sub-pixel positions between L0 and R0 and are computed as shown below.

EXAMPLE 31

$FL0=(-2*L1+61*L0+6*R0-1*R1+32)>>6;$ $FL1=(-4*L1+54*L0+16*R0-2*R1+32)>>6;$ $FL2=(-4*L1+42*L0+30*R0-4*R1+32)>>6;$ $H=(-4*L1+36*L0+36*R0-4*R1+32)>>6;$ $FR2=(-4*L1+30*L0+42*R0-4*R1+32)>>6;$ $FR1=(-2*L1+16*L0+54*R0-4*R1+32)>>6;$ $FR0=(-1*L1+6*L0+61*R0-2*R1+32)>>6;$

EXAMPLE 32

$FL0=(-2*L1+61*L0+6*R0-1*R1+32)>>6;$ $FL1=(-4*L1+54*L0+16*R0-2*R1+32)>>6;$ $FL2=(-5*L1+44*L0+29*R0-4*R1+32)>>6;$ $H=(-4*L1+36*L0+36*R0-4*R1+32)>>6;$ $FR2=(-4*L1+29*L0+44*R0-5*R1+32)>>6;$ $FR1=(-2*L1+16*L0+54*R0-4*R1+32)>>6;$ $FR0=(-1*L1+6*L0+61*R0-2*R1+32)>>6;$

Non-Uniform and Shifted Phase Offset Selection for Interpolation Filters Using Motion Information In another embodiment, phase offsets may be determined based on motion information. Particular embodiments may select phase offsets for interpolation filter 106 based on neighboring PUs, such as based on the statistical distribution (probability) of sub-pel phase delays and frequency selection preference. Also, the selection may be based on statistical properties (e.g., sub-pel positions, motion vectors, etc.) from neighboring temporal references that are already decoded.

For example, a fixed number of sub-pel positions may be provided for motion information (e.g., motion vectors). Each motion vector (or a motion vector delta in reference to a predicted motion vector) is coded using n bits (e.g., a fixed coded length). In one example, if neighboring PUs to a current PU point to a higher probability of a motion vector around 0 phase delay (the integer pel position), then the sub-pel pixel positions are non-uniform phase offsets would have a higher concentration around a 0 phase offset delay.

In another example, the motion information (e.g., motion vectors) is represented with a fixed number of sub-pel positions, and each motion vector is coded using variable length codes. In this example, if neighboring PUs to a current PU point to a probability distribution of motion vectors in the range of [0,1] (i.e., the interval between 0 to 1, including 0 but not excluding 1) pixel phase delay, then the sub-pel position may be selected based on entity constraint minimization of statistical cost (based on the given probability distribution) that can be a weighted sum of power of a residual signal after motion prediction and also the number of bits required to represent sub-pel motion information.

In a third example, motion information (e.g., motion vectors) is represented with a fixed number of sub-pel positions. In this example, if neighboring PUs to a current PU point to a higher probability of selecting an interpolation filter 106 with a narrower band and a given phase offset, then phase offsets corresponding to each sub-pel position selected to have a narrower frequency response.

In a fourth example, any combinations from the first three examples where the phase and shape of the set of interpolation filters 106 corresponding to a fixed or variable number of sub-pel positions are selected based on the statistical preference of neighboring PUs.

Particular embodiments determine phase offsets based on motion vector information. The motion vector information includes a motion vector predictor (MVP) from an already-coded PU and a coded motion vector difference (MVD) to refine the motion vector predictor and calculate the current motion vector. A current motion vector for a current PU being coded can be predicted from motion vectors of already coded PUs. The MVP is used to predict which motion vector can be used from an already coded block. The MVD is the difference between that motion vector and the current motion vector. If the motion field is smooth, then a statistical distribution of the motion vector is concentrated around the MVP. In this case, phase offsets may be selected such that the motion vector grid has a higher concentration around MVP. For example, if the motion vector predictor points to a motion vector around the 0 phase offset (e.g., an integer pel position), then the phase offsets should be closer to 0 as compared to a uniform phase offset spacing. For example, the phase offsets may be around 1/16 and 3/16 instead of a uniform 1/4 pel phase offset. Also, if the motion vector predictor points to a motion vector around the 1/2 phase offset, then phase offsets may be concentrated around the 1/2 phase offset, such as at 3/16 and 5/16.

EXAMPLE 1

In a first example, the motion information (motion vectors) includes a motion-vector-predictor (MVP) from an already coded PU and a coded motion-vector-difference to refine the MVP and calculate the current motion vector. If the motion field is smooth, then the statistical distribution of motion vector is concentrated around the MVP. In this case the phase offsets should be selected so that the motion vector grid has a higher concentration around MVP. As an example if the MVP points to a motion vector around 0 phase offset (i.e. an integer pel position) then MV equal one (in a quarter-pel MVP setup) should have a phase delay closer to 0 compared to uniform phase offset spacing which results in ¼ pel phase offset. The set of coefficient below are one example of such interpolation filter design:

If MVP SubPel offset is 0, then use the following set of filters:
- {64, 0, 0, 0, 0, 0, 0, 0}, //0
- {−1, 3, −8, 60, 13, −4, 1, 0}, //3/16
- {−1, 4, −11, 40, 40, −11, 4, −1}, //½
- {0, 1, −4, 13, 60, −8, 3, −1} //13/16

If MVP SubPel offset is ¼, then use the following set of filters:
- {−1, 2, −4, 64, 4, −2, 1, 0}, //1/16
- {−1, 4, −10, 58, 17, −5, 1, 0}, //¼
- {−1, 4, −11, 45, 34, −10, 4, −1}, //7/16
- {0, 1, −5, 17, 58, −10, 4, −1} //¾

If MVP SubPel offset is ½, then use the following set of filters:
- {64, 0, 0, 0, 0, 0, 0, 0}, //0
- {−1, 4, −11, 54, 23, −7, 3, −1}, //5/16
- {−1, 4, −11, 40, 40, −11, 4, −1}, //½
- {−1, 3, −7, 23, 54, −11, 4, −1} //11/16

If MVP SubPel offset is ¾, then use the following set of filters:
- {0, 1, −2, 4, 64, −4, 2, −1}, //15/16
- {−1, 4, −10, 58, 17, −5, 1, 0}, //¼
- {−1, 4, −10, 34, 45, −11, 4, −1}, //9/16
- {0, 1, −5, 17, 58, −10, 4, −1} //¾

EXAMPLE 2

To reduce the number of required filters the alternative filter set can also be used.

If MVP SubPel offset is 0, then use the following set of filters:
- {64, 0, 0, 0, 0, 0, 0, 0}, //0
- {−1, 3, −8, 60, 13, −4, 1, 0}, //3/16
- {−1, 4, −11, 40, 40, −11, 4, −1}, //½
- {0, 1, −4, 13, 60, −8, 3, −1} //13/16

If MVP SubPel offset is ¼, then use the following set of filters:
- {64, 0, 0, 0, 0, 0, 0, 0}, //0
- {−1, 4, −10, 58, 17, −5, 1, 0}, //¼
- {−1, 4, −11, 45, 34, −10, 4, −1}, //7/16
- {0, 1, −5, 17, 58, −10, 4, −1} //¾

If MVP SubPel offset is ½, then use the following set of filters:
- {64, 0, 0, 0, 0, 0, 0, 0}, //0
- {−1, 4, −11, 54, 23, −7, 3, −1}, //5/16
- {−1, 4, −11, 40, 40, −11, 4, −1}, //½
- {−1, 3, −7, 23, 54, −11, 4, −1} //11/16

If MVP SubPel offset is ¾, then use the following set of filters:
- {64, 0, 0, 0, 0, 0, 0, 0}, //0
- {−1, 4, −10, 58, 17, −5, 1, 0}, //¼
- {−1, 4, −10, 34, 45, −11, 4, −1}, //9/16
- {0, 1, −5, 17, 58, −10, 4, −1} //¾

EXAMPLE 3

Assuming the MVP Grid is at 0, 3/16, ½ and 13/16 grid) the following filter sets follow the concept in Example 1 with reduced number of filters.

If MVP SubPel offset is 0, then use the following set of filters:
- {64, 0, 0, 0, 0, 0, 0, 0}, //0
- {−1, 3, −8, 60, 13, −4, 1, 0}, //3/16
- {−1, 4, −11, 40, 40, −11, 4, −1} //½,
- {0, 1, −4, 13, 60, −8, 3, −1} //13/16

If MVP SubPel offset is 3/16, then use the following set of filters:
- {64, 0, 0, 0, 0, 0, 0, 0}, //0
- {−1, 3, −8, 60, 13, −4, 1, 0}, //3/16
- {−1, 4, −11, 45, 34, −10, 4, −1 }, //7/16
- {0, 1, −4, 13, 60, −8, 3, −1} //13/16

If MVP SubPel offset is ½, then use the following set of filters:
- {64, 0, 0, 0, 0, 0, 0, 0}, //0
- {−1, 4, −11, 54, 23, −7, 3, −1}, //5/16
- {−1, 4, −11, 40, 40, −11, 4, −1}, //½
- {−1, 3, −7, 23, 54, −11, 4, −1} //11/16

If MVP SubPel offset is 13/16, then use the following set of filters:
- {64, 0, 0, 0, 0, 0, 0, 0}, //0
- {−1, 3, −8, 60, 13, −4, 1, 0}, //3/16
- {−1, 4, −10, 34, 45, −11, 4, −1}, //9/16
- {0, 1, −4, 13, 60, −8, 3, −1} //13/16

EXAMPLE 4

In example 4, the motion information (motion vectors) includes a motion-vector-predictor (MVP) from an already coded PU without any refinement so MV=MVP. This can happen under some coding modes such as SKIP and MERGE. In such cases the phase offset of the sub-pixel interpolation filters 106 should follow the un-conditional MV statistics. For example, if the motion vectors are statistically more concentrated around zero then the following set of interpolation filters 106 can be used if MVP has a resolution of one-quarter:
- {64, 0, 0, 0, 0, 0, 0, 0}, //0
- {−1, 3, −8, 60, 13, −4, 1, 0}, //3/16
- {−1, 4, −11, 45, 34, −10, 4, −1}, //7/16
- {0, 1, −4, 13, 60, −8, 3, −1} //13/16

Selection of Non-Uniform, Shifted Phase Offsets, and Number of Offsets Based on Slice Type Particular embodiments may select a sub-pel interpolation filter 106 based on slice type. For example, a number of sub-pel positions and/or the non-uniform phase offsets are selected based on the slice type. The slice type may be either a B-slice or a P-slice. For a given slice type, filter determiner 108 determines a number of sub-pel positions (e.g., filter taps) and also the non-uniform phase offsets to use.

In B-slices, PUs have the opportunity to use bi-prediction to further reduce the prediction noise. In P-slices, PUs may have to condition the signal/noise by using different interpolation filters 106 to increase the coding efficiency. Also, in B-slices, two predictions can be averaged to better predict non-perfect sub-pel motions so there are more choices for predicting arbitrary sub-pel phase offsets. On the other hand, P-slices may select a set of sub-pel phase offsets that optimally predict a signal for a given number of sub-sample offsets. Note that even if a PU uses only one prediction in a B-slice, using the single prediction in a B-slice may still require a different set of interpolation filters 106 compared to that of P-slices.

In one example, two sets of fixed, four sub-pel position interpolation filters 106 include one set of interpolation filters 106 with a 3/16 pixel phase offset, a ½ pixel phase offset, a 13/16 pixel phase offset, and a 0 phase filter that may use samples without any filtering for PUs in P-slices with a narrower pass band. A second set of filters with the same phase offsets but a wider pass band for PUs in B-slices may be used.

In a second example, two sets of fixed, four sub-pel position interpolation filters 106 are used. One set of interpolation filters 106 has a 3/16 pixel phase offset, a ½ pixel phase offset, a ¹³⁄₁₆ pixel phase offset, and a 0 phase offset that uses samples without any filtering for PUs in P-slices with a narrower pass band. A second set of filters include a ¼ pixel phase offset, ½ pixel phase offset, and a ¾ pixel phase offset, and a wider pass band for PUs in B-slices.

In a third example, in two sets of fixed, sub-pel position interpolation filters 106, a first set of 8 filter taps with ⅛, ¼, ⅜, ½, ⅝, ¾, and ⅞ pixel phase offsets (besides the 0 phase offset) can be used for PUs in P-slices with a narrow pass band, and a second set of filters with four sub-pel interpolation filters 106 with a ¼ pixel phase offset, a ½ pixel phase offset, and a ¾ pixel phase offset, and a wider pass band are used for PUs in B-slices.

Additional examples are provided for different sub-pel interpolation filters 106 with non-uniform phase offsets based on three sub-pel positions (excluding the 0 phase offset) or a generalized four sub-pel position with no 0 phase offset.

EXAMPLE 1

Example 1 is for a fixed sub-pixel interpolation scheme with 8 taps and representative sub-pixel offsets at ³⁄₁₆, ½ and ¹³⁄₁₆. Phase offsets F1(³⁄₁₆), F2(½) and F3(¹³⁄₁₆) are interpolated using the values of spatial neighboring full-pel pixels, L3, L2, L1, L0, R0, R1, R2, and R3. For B-slice prediction the interpolation takes place as follows, $$F1=(-1*L3+3*L2-8*L1+60*L0+14*R0-6*R1+3*R2-1*R3+32)>>6;$$

$$F2=(-1*L3+4*L2-11*L1+40*L0+40*R0-11*R1+4*R2-1*R3+32)>>6;$$

$$F3=(-1*L3+3*L2-6*L1+14*L0+60*R0-8*R1+3*R2-1*R3+32)>>6;$$

For P-slice prediction the interpolation takes place as follows, $$F1=(-1*L3+3*L2-8*L1+60*L0+13*R0-4*R1+1*R2+0*R3+32)>>6;$$

$$F2=(-1*L3+4*L2-11*L1+40*L0+40*R0-11*R1+4*R2-1*R3+32)>>6;$$

$$F3=(0*L3+1*L2-4*L1+13*L0+60*R0-8*R1+3*R2-1*R3+32)>>6;$$

Table 1 summarizes the filter coefficients for B-slice prediction.

TABLE 1 sub-pel pixel interpolation filter coefficients for B-slice

| POSITION | COEFFICIENTS |
|---|---|
| F1 | {−1, 3, −8, 60, 14, −6, 3, −1,} |
| F2 | {−1, 4, −11, 40, 40, −11, 4, −1,} |
| F3 | {−1, 3, −6, 14, 60, −8, 3, −1,} |

Table 2 summarizes the filter coefficients for P-slice prediction

TABLE 2 sub-pel pixel interpolation filter coefficients for P-slice

| POSITION | COEFFICIENTS |
|---|---|
| F1 | {−1, 3, −8, 60, 13, −4, 1, 0,} |
| F2 | {−1, 4, −11, 40, 40, −11, 4, −1,} |
| F3 | {0, 1, −4, 13, 60, −8, 3, −1,} |

EXAMPLE 2

Example 2 is for a fixed sub-pixel interpolation scheme combination of 7 and 8 taps. Phase offsets F1, F2 and F3 are interpolated using the values of spatial neighboring full-pel pixels, L3, L2, L1, L0, R0, R1, R2, and R3. For B-slice prediction the interpolation choices correspond to ¼(F1), ½(F2) and ¾(F3) sub-pixel phase shifts and takes place as follows, $$F1=(-1*L3+4*L2-10*L1+57*L0+19*R0-7*R1+3*R2-1*R3+32)>>6;$$

$$F2=(-1*L3+4*L2-11*L1+40*L0+40*R0-11*R1+4*R2-1*R3+32)>>6;$$

$$F3=(-1*L3+3*L2-7*L1+19*L0+57*R0-10*R1+4*R2-1*R3+32)>>6;$$

For P-slice prediction the interpolation choices correspond to ³⁄₁₆(F1), ½(F2) and ¹³⁄₁₆(F3) sub-pixel phase shifts and takes place as follows, $$F1=(-1*L3+3*L2-8*L1+60*L0+13*R0-4*R1+1*R2+0*R3+32)>>6;$$

$$F2=(-1*L3+4*L2-11*L1+40*L0+40*R0-11*R1+4*R2-1*R3+32)>>6;$$

$$F3=(0*L3+1*L2-4*L1+13*L0+60*R0-8*R1+3*R2-1*R3+32)>>6;$$

Table 3 summarizes the filter coefficients for B-slice prediction

TABLE 3 sub-pel pixel interpolation filter coefficient for B-slice

| POSITION | COEFFICIENTS |
|---|---|
| F1 | {−1, 4, −10, 57, 19, −7, 3, −1,} |
| F2 | {−1, 4, −11, 40, 40, −11, 4, −1,} |
| F3 | {−1, 3, −7, 19, 57, −10, 4, −1,} |

Table 4 summarizes the filter coefficients for P-slice prediction

TABLE 4 sub-pel pixel interpolation filter coefficient for P-slice

| POSITION | COEFFICIENTS |
|---|---|
| F1 | {−1, 3, −8, 60, 13, −4, 1, 0,} |
| F2 | {−1, 4, −11, 40, 40, −11, 4, −1,} |
| F3 | {0, 1, −4, 13, 60, −8, 3, −1,} |

The following will describe encoder 102 and decoder 104 examples that may be used with particular embodiments.

Encoder and Decoder Examples

Figure 8A:
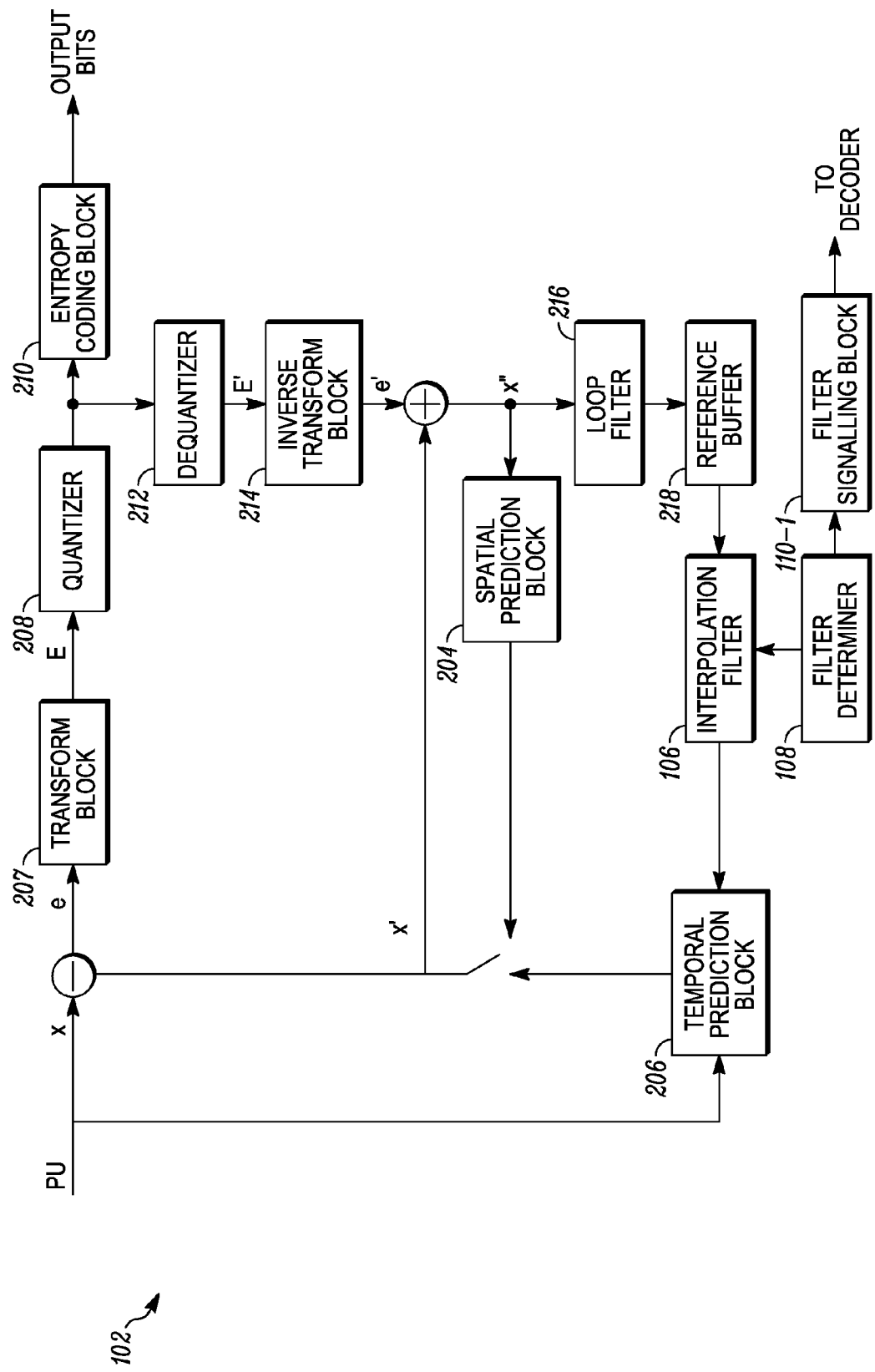
FIG. 8A depicts an example of an encoder according to one embodiment.

FIG. 8A depicts an example of an encoder 102 according to one embodiment. A general operation of encoder 102 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 204 may include different spatial prediction directions per PU, such as horizontal, vertical, 45-degree diagonal, 135-degree diagonal, DC (flat averaging), and planar.

A temporal prediction block 206 performs temporal prediction through a motion estimation and motion compensation operation. The motion estimation operation searches for a best match prediction for the current PU over reference pictures. The best match prediction is described by a motion vector (MV) and associated reference picture (refIdx). The motion vector and associated reference picture are included in the coded bit stream.

Transform block 207 performs a transform operation with the residual PU, e. Transform block 207 outputs the residual PU in a transform domain, E.

A quantizer 208 then quantizes the transform coefficients of the residual PU, E. Quantizer 208 converts the transform coefficients into a finite number of possible values. Entropy coding block 210 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 102, a de-quantizer 212 de-quantizes the quantized transform coefficients of the residual PU. De-quantizer 212 then outputs the de-quantized transform coefficients, E'. An inverse transform block 214 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 216 performs de-blocking on the reconstructed PU, x", to reduce blocking artifacts. Additionally, loop filter 216 may perform a sample adaptive offset process after the completion of the de-blocking filter process for the decoded picture, which compensates for a pixel value offset between reconstructed pixels and original pixels. Also, loop filter 216 may perform adaptive filtering over the reconstructed PU, which minimizes coding distortion between the input and output pictures. Additionally, if the reconstructed pictures are reference pictures, the reference pictures are stored in a reference buffer 218 for future temporal prediction.

Interpolation filter 106 interpolates sub-pel pixel values for temporal prediction block 206. The phase offsets may be non-uniform. Also, filter determiner 108 may implicitly determine interpolation filter 106. Also, filter signaling block 110-1 explicitly signals information for use in determining interpolation filter 106 at certain times. Temporal prediction block 206 then uses the sub-pel pixel values outputted by interpolation filter 106 to generate a prediction of a current PU.

Figure 8B:
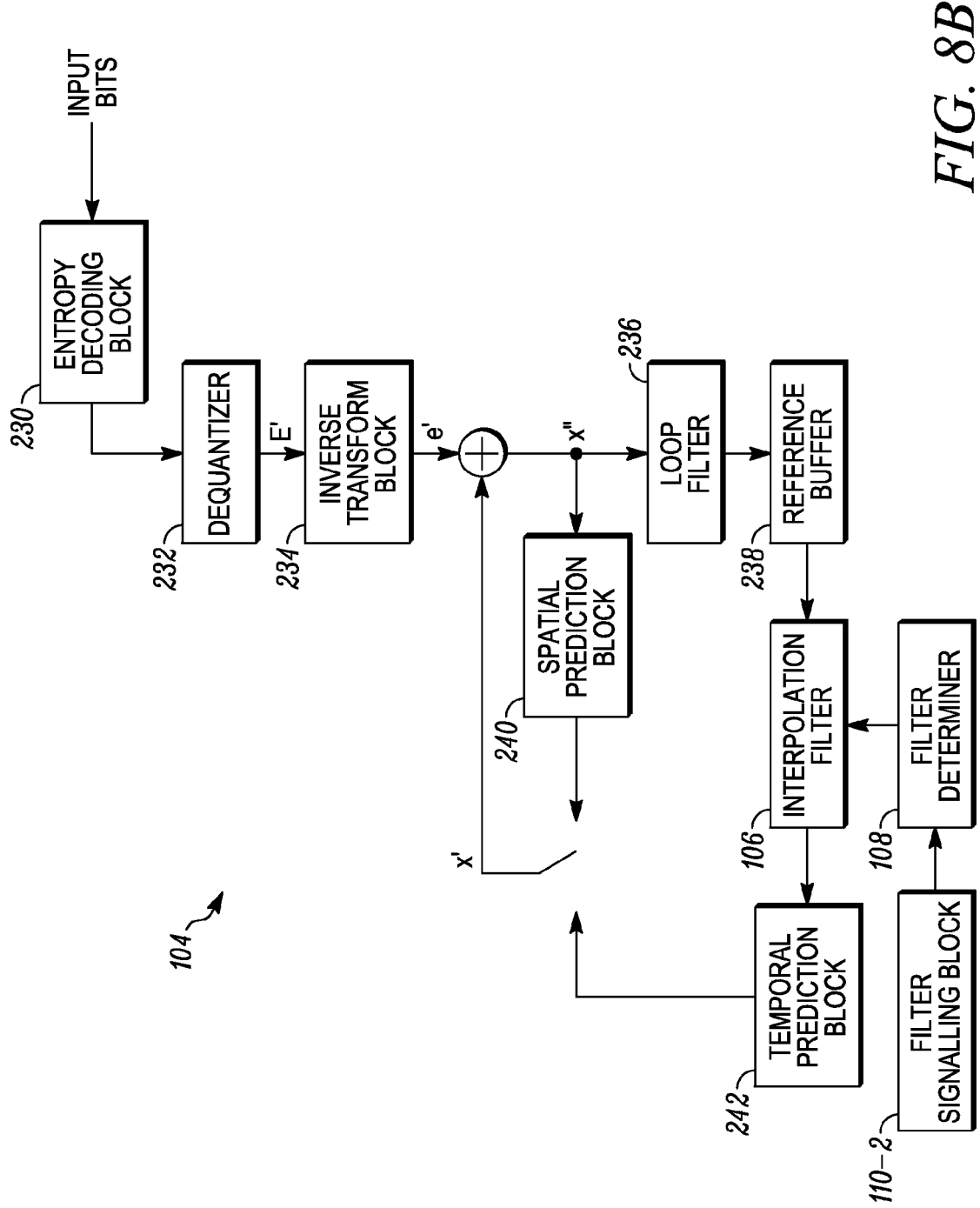
FIG. 8B depicts an example of a decoder according to one embodiment.

FIG. 8B depicts an example of decoder 104 according to one embodiment. A general operation of decoder 104 will now be described. It will be understood that variations on the decoding process described will be appreciated by a person skilled in the art based on the disclosure and teachings herein. Decoder 104 receives input bits from encoder 102 for compressed video content.

An entropy decoding block 230 performs entropy decoding on input bits corresponding to quantized transform coefficients of a residual PU. A de-quantizer 232 de-quantizes the quantized transform coefficients of the residual PU. De-quantizer 232 then outputs the de-quantized transform coefficients of the residual PU, E'. An inverse transform block 234 receives the de-quantized transform coefficients, which are then inverse transformed resulting in a reconstructed residual PU, e'.

The reconstructed PU, e', is then added to the corresponding prediction, x', either spatial or temporal, to form the new constructed PU, x". A loop filter 236 performs de-blocking on the reconstructed PU, x", to reduce blocking artifacts. Additionally, loop filter 236 may perform a sample adaptive offset process after the completion of the de-blocking filter process for the decoded picture, which compensates for a pixel value offset between reconstructed pixels and original pixels. Also, loop filter 236 may perform an adaptive loop filter over the reconstructed PU, which minimizes coding distortion between the input and output pictures. Additionally, if the reconstructed pictures are reference pictures, the reference pictures are stored in a reference buffer 238 for future temporal prediction.

The prediction PU, x', is obtained through either spatial prediction or temporal prediction. A spatial prediction block 240 may receive decoded spatial prediction directions per PU, such as horizontal, vertical, 45-degree diagonal, 135-degree diagonal, DC (flat averaging), and planar. The spatial prediction directions are used to determine the prediction PU, x'.

Interpolation filter 106 interpolates sub-pel pixel values for input into a temporal prediction block 242. The phase offsets may be non-uniform as described above. Also, filter determiner 108 may implicitly determine interpolation filter 106. Also, filter signaling block 110-2 receives information for use in determining interpolation filter 106 at certain times. Temporal prediction block 242 performs temporal prediction using decoded motion vector information and interpolated sub-pel pixel values outputted by interpolation filter 106 in a motion compensation operation. Temporal prediction block 242 outputs the prediction PU, x'.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for encoding or decoding video content, the method comprising:
   determining a plurality of sets of interpolation filters for use in interpolating sub-pel pixel values for a temporal prediction process of video content, wherein different sets of interpolation filters include different phase offset characteristics;
   receiving a unit of video content; and
   selecting one of the set of interpolation filters to interpolate a set of sub-pel pixel values for use in the temporal prediction process for the unit of video content based on characteristics associated with the encoding or decoding of the video content, wherein the one of the set of interpolation filters is selected based on the phase offset characteristic of the one of the set of interpolation filters and the characteristics associated with the encoding or decoding, wherein the phase offset characteristic for the one of the set of interpolation filters comprises a set of sub-pel pixel positions that is non-uniform in spacing between the set of sub-pel pixel positions.

2. The method of claim 1, wherein the different phase offset characteristics comprise different phase offset spacing between sub-pel pixel positions or a different number of sub-pel pixel positions.

3. The method of claim 1, wherein the phase offsets for a first set of interpolation filters include sub-pel pixel positions are a different number of sub-pixel positions from a second set of interpolation filters, but the sub-pixel positions for the first set of interpolation filters or the second set of interpolation filters are uniformly spaced between the sub-pel pixel positions.

4. The method of claim 1, wherein the phase offsets for the set of sub-pel pixel positions is adaptively determined for the unit of the video content.

5. The method of claim 1, wherein the characteristics associated with the encoding or decoding comprise the video content or a coding condition, the method further comprising:
determining information associated with the video content or a coding condition,
wherein determining the set of interpolation filters comprises adaptively determining which phase offsets for the sub-pel pixel positions are to be used for the one of the plurality of sets of interpolation filters based on the determined information.

6. The method of claim 1, wherein:
the one of the plurality of sets of interpolation filters is adaptively determined, and
the characteristics associated with the encoding or decoding and the one of the plurality of sets of interpolation filters are determined independently by an encoder and a decoder.

7. The method of claim 1, wherein:
the interpolation filter is adaptively determined, and
selection information identifying the adaptively determined interpolation filter is sent by an encoder to a decoder.

8. The method of claim 1, wherein:
the characteristics are determined based on a slice type of the unit of the video content; and
selecting the one of the set of interpolation filters comprises adaptively determining the one of the plurality of sets of interpolation filters based on whether the slice type is a B picture or a P picture.

9. The method of claim 8, wherein:
a non-uniform spacing for a number of sub-pel pixel positions are determined based on the slice type,
a number of sub-pel pixel positions are determined based on the slice type, or
coefficient values for the set of sub-pel pixel positions are determined based on the slice type.

10. The method of claim 1, wherein:
the characteristics of encoding or decoding are determined based on a size of the unit of video content; and
selecting the one of the plurality of sets of interpolation filters comprises adaptively determining the one of the plurality of sets of interpolation filters to include phase offsets for a set of sub-pel pixel positions based on the size.

11. The method of claim 1, wherein:
the characteristics are determined based on motion information for a reference picture for the unit of video content; and
selecting the one of the plurality of sets of interpolation filters comprises adaptively determining the one of the plurality of sets of interpolation filters to include phase offsets for a set of sub-pel pixel positions based on motion information.

12. The method of claim 1, wherein:
the characteristics are determined based on a motion vector predictor for a reference picture associated with the unit of the video content; and
selecting the one of the plurality of sets of interpolation filters comprises adaptively determining the one of the plurality of sets of interpolation filters to include phase offsets for a set of sub-pel pixel positions based on a phase offset position in which the motion vector predictor is pointing.

13. The method of claim 1, further comprising:
determining a set of full-pel values for pixels for the video content;
applying the set of full-pel pixel values to a set of taps of the one of the plurality of sets of interpolation filters to interpolate a set of sub-pel pixel values corresponding to a set of sub-pel pixel positions; and
outputting the sub-pel pixel values for use in performing temporal prediction for the unit of video content.

14. The method of claim 1, wherein the one of the plurality of sets of interpolation filters does not use a zero phase offset.

15. An apparatus configured to encode or decode video content, the apparatus comprising:
one or more computer processors; and
a computer-readable storage medium comprising instructions, that when executed, control the one or more computer processors to be operable to:
determining a plurality of sets of interpolation filters for use in interpolating sub-pel pixel values for a temporal prediction process of video content, wherein different sets of interpolation filters include different phase offset characteristics;
receiving a unit of video content; and
selecting one of the set of interpolation filters to interpolate a set of sub-pel pixel values for use in the temporal prediction process for the unit of video content based on characteristics associated with the encoding or decoding of the video content, wherein the one of the set of interpolation filters is selected based on the phase offset characteristic of the one of the set of interpolation filters and the characteristics associated with the encoding or decoding,
wherein the phase offset characteristic for the one of the set of interpolation filters comprises a set of sub-pel pixel positions that is non-uniform in spacing between the set of sub-pel pixel positions.

16. The apparatus of claim 15, wherein the different phase offset characteristics comprise different phase offset spacing between sub-pel pixel positions or a different number of sub-pel pixel positions.

17. The apparatus of claim 15, wherein the phase offsets for a first set of interpolation filters include sub-pel pixel positions are a different number of sub-pixel positions from a second set of interpolation filters, but the sub-pixel positions for the first set of interpolation filters or the second set of interpolation filters are uniformly spaced between the sub-pel pixel positions.

18. The apparatus of claim 15, wherein:
the characteristics are determined based on a slice type of the unit of the video content; and
selecting the one of the set of interpolation filters comprises adaptively determining the one of the plurality of sets of interpolation filters based on whether the slice type is a B picture or a P picture.

19. A method for encoding or decoding video content, the method comprising:
receiving a unit of video content;
determining characteristics associated with the encoding or decoding of the video content; and
determining a set of interpolation filters to interpolate a set of sub-pel pixel values for use in a temporal prediction process for the unit of video content based on the characteristics associated with the encoding or decoding of the video content, wherein the set of interpolation filters include a set of sub-pel pixel positions that have non-uniform phase offset spacing between the sub-pel pixel positions to interpolate the set of sub-pel pixel values.

20. The method of claim 19, wherein the non-uniform phase offset spacing between the set of sub-pel pixel positions is fixed for multiple units of the video content.

21. The method of claim 19, wherein the non-uniform phase offset spacing between the set of sub-pel pixel positions is adaptively determined for the unit of the video content.

22. The method of claim 19, wherein the characteristics comprise the video content, the method further comprising:
determining information associated with the video content,
wherein determining the set of interpolation filters comprises adaptively determining which non-uniform phase offset spacing between the sub-pel pixel positions is to be used for the set of interpolation filters based on the determined information.

23. The method of claim 19, wherein the characteristics comprise a coding condition used in encoding or decoding the unit of video content, the method further comprising:
determining information associated with the coding condition,
wherein determining the set of interpolation filters comprises adaptively determining which non-uniform phase offset spacing between the sub-pel pixel positions is to be used for the set of interpolation filters based on the determined information.

24. The method of claim 19, wherein:
the interpolation filter is adaptively determined, and
the characteristics and the interpolation filter are determined independently by an encoder and a decoder.

25. The method of claim 19, wherein:
the interpolation filter is adaptively determined, and
selection information identifying the adaptively determined interpolation filter is sent by an encoder to a decoder.

26. The method of claim 19, wherein:
the characteristics are determined based on a slice type of the unit of the video content; and
determining the interpolation filter comprises adaptively determining the non-uniform phase offset spacing between the set of sub-pel pixel positions based on whether the slice type is a B picture or a P picture.

27. The method of claim 26, wherein:
a number of sub-pel pixel positions are determined based on the slice type, or
coefficient values for the set of sub-pel pixel positions are determined based on the slice type.

28. The method of claim 19, wherein:
the characteristics are determined based on a size of the unit of video content; and
determining the interpolation filter comprises adaptively determining the non-uniform phase offset spacing between the set of sub-pel pixel positions based on the size.

29. The method of claim 19, wherein:
the characteristics are determined based on motion information for a reference picture for the unit of video content; and
determining the interpolation filter comprises adaptively determining the non-uniform phase offset spacing between the set of sub-pel pixel positions based on different motion information.

30. The method of claim 19, wherein:
the characteristics are determined based on a motion vector predictor for a reference picture associated with the unit of the video content; and
determining the interpolation filter comprises adaptively determining the non-uniform phase offset spacing between the set of sub-pel pixel positions based on a phase offset position in which the motion vector predictor is pointing.

31. A method for encoding or decoding video content, the method comprising:
receiving a unit of video content; and
determining characteristics associated with the encoding or decoding of the video content;
determining a set of interpolation filters to interpolate a set of sub-pel pixel values for use in a temporal prediction process for the unit of video content based on the characteristics associated with the encoding or decoding of the video content, wherein the set of interpolation filters include a set of sub-pel pixel positions that do not include a zero phase offset position, and wherein the set of sub-pel pixel positions are used to interpolate the set of sub-pel pixel values.

* * * * *